United States Patent
Kim et al.

(10) Patent No.: US 10,699,120 B1
(45) Date of Patent: Jun. 30, 2020

(54) EMPTY HOUSE UTILIZATION EVALUATION METHOD, AND SERVER AND SYSTEM USING THE SAME

(71) Applicant: AJOU UNIVERSITY INDUSTRY-ACADEMIC COOPERATION FOUNDATION, Suwon-si, Gyeonggi-do (KR)

(72) Inventors: Ik Jun Kim, Seoul (KR); Ju Young Kang, Suwon-si (KR); Hyo Min Kim, Anyang-si (KR); Jun Ho Lee, Yongin-si (KR)

(73) Assignee: AJOU UNIVERSITY INDUSTRY-ACADEMIC COOPERATION FOUNDATION, Suwon-si (KR)

( * ) Notice: Subject to any disclaimer, the term of this patent is extended or adjusted under 35 U.S.C. 154(b) by 0 days.

(21) Appl. No.: 16/791,393

(22) Filed: Feb. 14, 2020

(30) Foreign Application Priority Data

Feb. 15, 2019 (KR) .......................... 10-2019-0018172

(51) Int. Cl.
*G06K 9/00* (2006.01)
*G06K 9/46* (2006.01)

(52) U.S. Cl.
CPC .......... *G06K 9/00637* (2013.01); *G06K 9/469* (2013.01); *G06K 9/00697* (2013.01);
(Continued)

(58) Field of Classification Search
CPC .. G06K 9/00771; G06K 9/46; G06K 9/00697; G06K 9/00778; G06K 9/00785; G06K 9/00637; G06K 9/469
See application file for complete search history.

(56) References Cited

U.S. PATENT DOCUMENTS

2019/0236365 A1* 8/2019 Speasl ............... G06K 9/00671

FOREIGN PATENT DOCUMENTS

KP 10-2010-0036557 A 4/2010
KR 10-1859341 B1 5/2018

OTHER PUBLICATIONS

"Investigation on the status of vacant houses and research on building information system", Jun. 30, 2017, http://www.prism.go/kr/homepage/entire/retrieveEntireList.do?leftMenuLevel=160&cond_research_name=% EB% B9% 88% EC% A7% 91 +% EC% 8B% A4% ED% 83% 9C% EC% A1% B0% EC% 82% AC & x=0 & y=0.

(Continued)

*Primary Examiner* — Kenny A Cese
(74) *Attorney, Agent, or Firm* — Sughrue Mion, PLLC

(57) ABSTRACT

The inventive concept relate to an empty house utilization evaluation method comprising receiving, by an empty house utilization evaluation server, satellite image data for an empty house to be evaluated, extracting, by the empty house utilization evaluation server, images of a population element, a traffic element, a natural element, and a social element of the empty house to be evaluated from the received satellite image data, analyzing, by the empty house utilization evaluation server, utilization of the empty house to be evaluated based on the extracted images of the population element, the traffic element, a natural element, and the social element of the empty house to be evaluated and suggesting, by the empty house utilization evaluation server, a use of the empty house to be evaluated according to a result of the analyzing utilization of the empty house to be evaluated.

13 Claims, 5 Drawing Sheets

(52) U.S. Cl.
CPC ..... *G06K 9/00771* (2013.01); *G06K 9/00778* (2013.01); *G06K 9/00785* (2013.01)

(56) References Cited

OTHER PUBLICATIONS

Notification of Reason for Refusal for corresponding KR 10-2019-0018172, dated Jun. 7, 2019.
Notice of Allowance for corresponds to KR 10-2019-0018172, dated Aug. 12, 2019.

\* cited by examiner

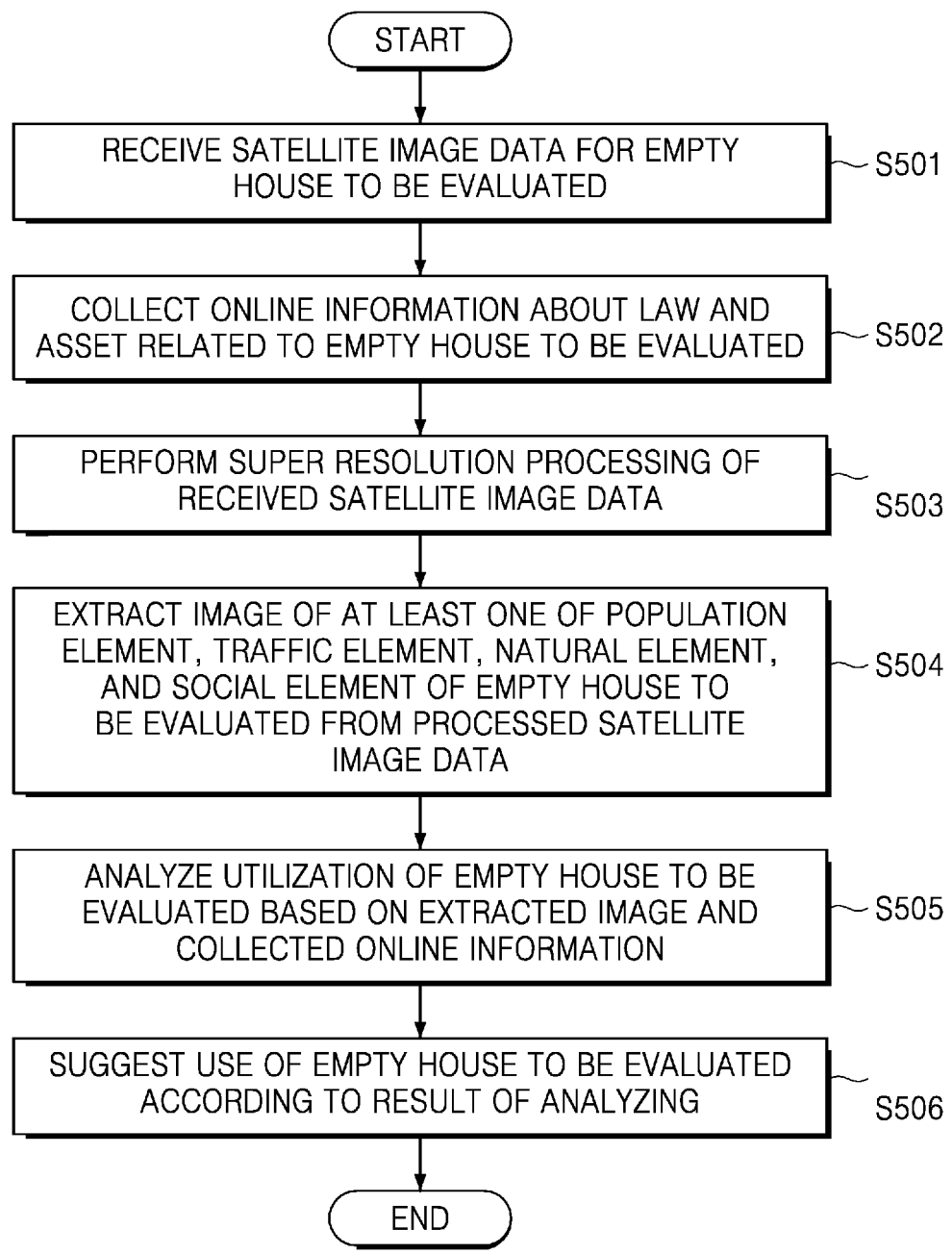

EMPTY HOUSE UTILIZATION EVALUATION METHOD, AND SERVER AND SYSTEM USING THE SAME

BACKGROUND

1. Field

The disclosure relates to an empty house utilization evaluation method, and a server and a system using the empty house utilization evaluation method, and more particularly, to an empty house utilization evaluation method capable of extracting an image of at least one of a population element, a traffic element, a natural element, and a social element of an empty house to be evaluated from satellite image data of the empty house to be evaluated and suggesting a use of the empty house to be evaluated based on the image, and a server and a system using the empty house utilization evaluation method.

2. Description of the Related Art

The number of empty houses is increasing nationwide due to urban concentration and population aging. Most of the empty houses are left unused, and thus the space occupied by the empty houses is also wasted.

The government is trying to implement and expand the maintenance project to repair the empty houses, but there is a limit in obtaining accurate information about the empty houses and selecting and suggesting a suitable use for each empty house.

SUMMARY

Provided are an empty house utilization evaluation method capable of extracting an image of at least one of a population element, a traffic element, a natural element, and a social element of an empty house to be evaluated from satellite image data of the empty house to be evaluated and suggesting a use of the empty house to be evaluated based on the image, and a server and a system using the empty house utilization evaluation method.

According to an aspect of an embodiment, An empty house utilization evaluation method comprising receiving, by an empty house utilization evaluation server, satellite image data for an empty house to be evaluated; extracting, by the empty house utilization evaluation server, images of a population element, a traffic element, a natural element, and a social element of the empty house to be evaluated from the received satellite image data; analyzing, by the empty house utilization evaluation server, utilization of the empty house to be evaluated based on the extracted images of the population element, the traffic element, a natural element, and the social element of the empty house to be evaluated; and suggesting, by the empty house utilization evaluation server, a use of the empty house to be evaluated according to a result of the analyzing utilization of the empty house to be evaluated, wherein the analyzing of the utilization of the empty house to be evaluated comprises: analyzing, by the empty house utilization evaluation server, a walking amount of pedestrians around the empty house to be evaluated and a stay time of the pedestrians using the extracted image of the population element of the empty house to be evaluated; and analyzing, by the empty house utilization evaluation server, a green zone ratio, air pollution information, and illumination around the empty house to be evaluated using the extracted image of the natural element of the empty house to be evaluated, wherein the empty house utilization evaluation server analyzes air pollution information according to the degree of dust, fine dust, and ultrafine dust shown in the image of the natural element of the empty house to be evaluated, and the suggesting of the use of the empty house to be evaluated comprises suggesting the use of the empty house to be evaluated using a mapping table in which corresponding uses are mapped according to grades of the population element, the traffic element, the natural element, and the social element.

In some embodiments, the empty house utilization evaluation method further comprises prior to receiving the satellite image data, receiving, by the empty house utilization evaluation server, empty house information transmitted from the first user and storing the received empty house information.

In some embodiments, the empty house utilization evaluation method further comprises after storing the received empty house information, searching, by the empty house utilization evaluation server in response to an empty house utilization evaluation request by a second user, information about the empty house to be evaluated corresponding to the empty house utilization evaluation request among stored empty house information.

In some embodiments, the empty house utilization evaluation method further comprises after searching the information about the empty house to be evaluated, requesting, by the empty house utilization evaluation server, satellite image data of the found empty house to be evaluated.

In some embodiments, the empty house utilization evaluation method further comprises generating, by the empty house utilization evaluation server, satellite image data subjected to super resolution by super resolution processing the received satellite image data.

In some embodiments, the empty house utilization evaluation method further comprises extracting pedestrians within a reference radius from the empty house to be evaluated among extracted pedestrians in the satellite image data as the image of the population element of the empty house to be evaluated using histogram of oriented gradient (HOG).

In some embodiments, the analyzing of the utilization of the empty house to be evaluated comprises analyzing, by the empty house utilization evaluation server, traffic volume around the empty house to be evaluated, public transportation access around the empty house to be evaluated, and the number of illegal parking vehicles around the empty house to be evaluated using the extracted image of the traffic element of the empty house to be evaluated.

In some embodiments, the analyzing of the utilization of the empty house to be evaluated comprises analyzing, by the empty house utilization evaluation server, a distance between the empty house to be evaluated and a peripheral neighborhood living facility and a distance between the empty house to be evaluated and a peripheral tourist destination using the extracted image of the social element of the empty house to be evaluated.

In some embodiments, the empty house utilization evaluation method further comprises collecting, by the empty house utilization evaluation server, legal information and asset information about the empty house to be evaluated online.

In some embodiments, the suggesting of the use of the empty house to be evaluated comprises suggesting the use of the empty house to be evaluated according to a result of the analyzing of the utilization of the empty house to be evaluated, and the collected legal information and asset information about the empty house to be evaluated.

In some embodiments, the legal information about the empty house to be evaluated comprises information about a form of the empty house to be evaluated, the form that may be changed from the existing use of the empty house to be evaluated, and the asset information about the empty house to be evaluated comprises information about an official land price, a market price, a deterioration degree, and an area of the empty house to be evaluated.

According to an aspect of an embodiment, an empty house utilization evaluation server, the empty house utilization evaluation server comprising at least one processor and a memory under control of the processor and the memory includes a computer program enabling the empty house utilization evaluation server to perform operations comprising receiving satellite image data for an empty house to be evaluated; extracting images of a population element, a traffic element, a natural element, and a social element of the empty house to be evaluated from the received satellite image data; analyzing utilization of the empty house to be evaluated based on the extracted images of the population element, the traffic element, the natural element, and the social element of the empty house to be evaluated; and suggesting a use of the empty house to be evaluated according to a result of the analyzing of the utilization of the empty house to be evaluated, wherein the empty house utilization evaluation server analyzes a walking amount of pedestrians around the empty house to be evaluated and a stay time of the pedestrians using the extracted image of the population element of the empty house to be evaluated, and analyzes a green zone ratio, air pollution information, and illumination around the empty house to be evaluated using the extracted image of the natural element of the empty house to be evaluated, wherein the air pollution information is analyzed according to the degree of dust, fine dust, or ultrafine dust shown in the image of the natural element of the empty house to be evaluated, and the empty house utilization evaluation server suggests the use of the empty house to be evaluated using a mapping table in which corresponding uses are mapped according to grades of the population element, the traffic element, the natural element, and the social element.

According to an aspect of an embodiment, an empty house utilization evaluation system comprising a user terminal; and an empty house utilization evaluation server configured to perform a utilization evaluation of an empty house to be evaluated requested by the user terminal, and to provide the user terminal with a use of the empty house to be evaluated suggested according to a result of the utilization evaluation, wherein the empty house utilization evaluation server comprises at least one processor and a memory under control of the processor and the memory includes a computer program enabling the empty house utilization evaluation server to perform operations comprising: receiving satellite image data for an empty house to be evaluated; extracting images of a population element, a traffic element, a natural element, and a social element of the empty house to be evaluated from the received satellite image data; analyzing utilization of the empty house to be evaluated based on the extracted images of the population element, the traffic element, the natural element, and the social element of the empty house to be evaluated; and suggesting the use of the empty house to be evaluated according to a result of the analyzing of the utilization of the empty house to be evaluated, wherein the empty house utilization evaluation server analyzes a walking amount of pedestrians around the empty house to be evaluated and a stay time of the pedestrians using the extracted image of the population element of the empty house to be evaluated, and analyzes a green zone ratio, air pollution information, and illumination around the empty house to be evaluated using the extracted image of the natural element of the empty house to be evaluated, wherein the air pollution information is analyzed according to the degree of dust, fine dust, or ultrafine dust shown in the image of the natural element of the empty house to be evaluated, and the empty house utilization evaluation server suggests the use of the empty house to be evaluated using a mapping table in which corresponding uses are mapped according to grades of the population element, the traffic element, the natural element, and the social element.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 5 is a flowchart of an empty house utilization evaluation method according to an embodiment.

DETAILED DESCRIPTION

Figure 1:
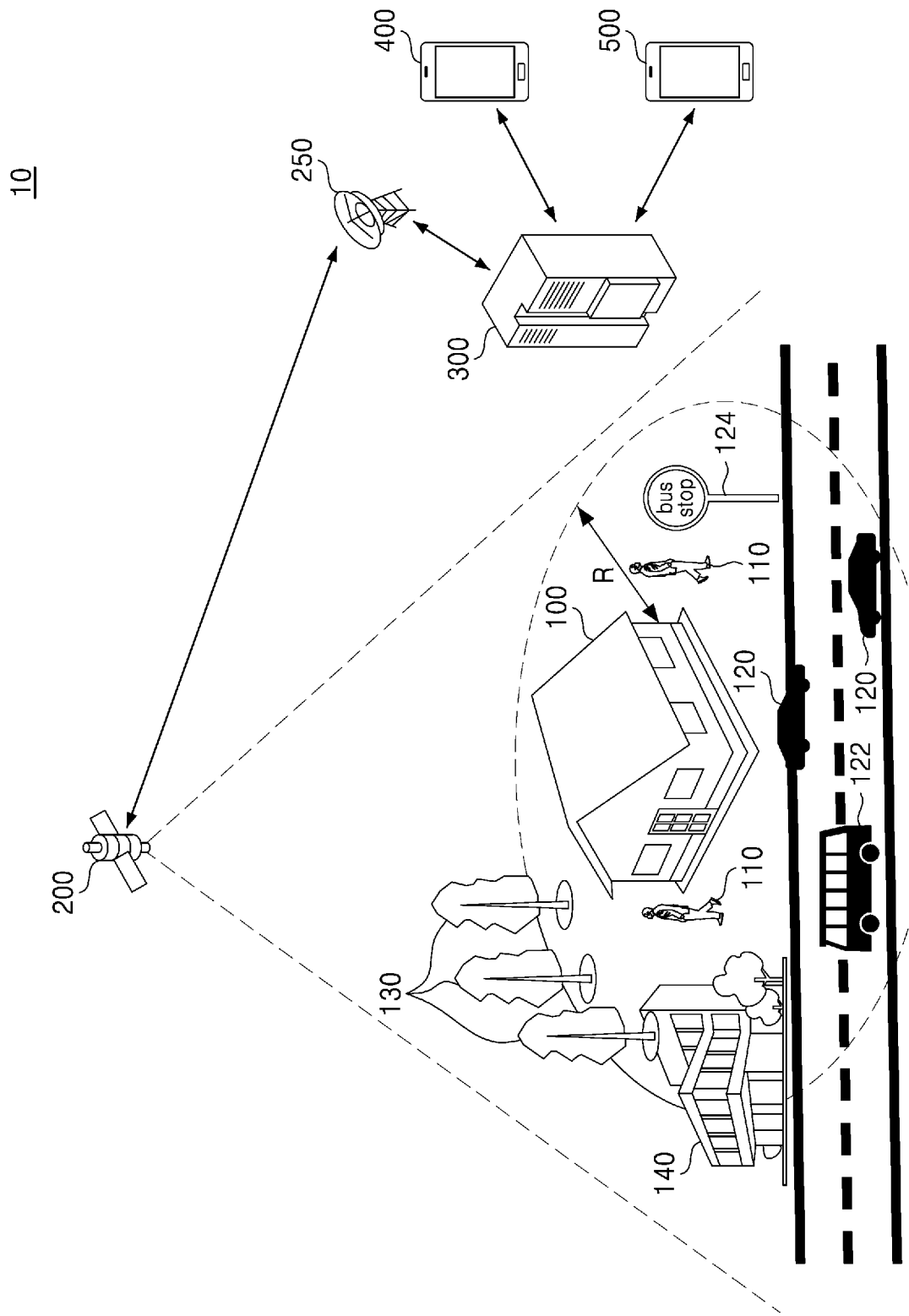
FIG. 1 is a conceptual diagram of an empty house utilization evaluation system according to an embodiment.

The inventive concept may be variously modified and have various example embodiments, so that specific example embodiments will be illustrated in the drawings and described in the detailed description. However, this does not limit the inventive concept to specific example embodiments, and it should be understood that the inventive concept covers all the modifications, equivalents and replacements included within the idea and technical scope of the inventive concept.

In describing the inventive concept, in the following description, a detailed explanation of known related technologies may be omitted to avoid unnecessarily obscuring the subject matter of the inventive concept. In addition, numeral figures (for example, 1, 2, and the like) used during describing the specification are just identification symbols for distinguishing one element from another element.

Further, in the specification, if it is described that one component is "connected" or "accesses" the other component, it is understood that the one component may be directly connected to or may directly access the other component but unless explicitly described to the contrary, another component may be "connected" or "access" between the components.

In addition, each processes may be performed by hardware such as a processor, a microprocessor, a micro controller, a central processing unit (CPU), a graphics processing unit (GPU), an accelerated Processing unit (APU), a digital signal processor (DSP), an application specific integrated circuit (ASIC), and a field programmable gate array (FPGA) or a combination of hardware and software in a system. Furthermore, the system may include a memory that stores program or data necessary for processing at least one function or operation.

Moreover, it is intended to clarify that components in the specification are distinguished in terms of primary functions of the components. That is, two or more components to be described below may be provided to be combined to one component or one component may be provided to be divided into two or more components for each more subdivided function. In addition, each of the respective components to be described below may additionally perform some or all functions among functions which other components take charge of in addition to a primary function which each component takes charge of and some functions among the primary functions which the respective components take charge of are exclusively charged by other components to be performed, of course.

Hereinafter, embodiments of the disclosure will be described in detail.

FIG. 1 is a conceptual diagram of an empty house utilization evaluation system according to an embodiment.

As used herein, the term "empty house utilization" may broadly mean a form in which an empty house may be utilized and a degree suitable for the empty house to be utilized in the form.

An empty house utilization evaluation system 10 according to an embodiment is a system for evaluating the utilization of an empty house 100 to be evaluated, and may include a satellite 200, an ground station 250, an empty house utilization evaluation server 300, a first user terminal 400, and a second user terminal 500.

The empty house 100 to be evaluated may refer to an empty house to be evaluated by a user who uses the empty house utilization evaluation system 10.

According to an embodiment, the empty house 100 to be evaluated may refer to an empty house corresponding to an empty house utilization evaluation request by the second user terminal 500, among empty houses with information registered in the empty house utilization evaluation server 300 through the first user terminal 400.

Pedestrians 110, vehicles 120, public transportation 122, a boarding place 124 of public transportation, a green zone 130, and a neighborhood living facility 140 may be located around the empty house 100 to be evaluated.

The satellite 200 may obtain a satellite image of the empty house 100 to be evaluated by using a satellite camera mounted on the satellite 200 and may transmit satellite image data about the obtained satellite image to the ground station 250.

The ground station 250 is located on the ground and may be provided with a satellite antenna to receive various pieces of data transmitted from the satellite 200. The ground station 250 may receive satellite image data transmitted from the satellite 200 and may transmit the received satellite image data to the empty house utilization evaluation server 300.

According to an embodiment, the empty house utilization evaluation system 10 may be implemented in a form that does not include the ground station 250.

According to another embodiment, the empty house utilization evaluation system 10 may include a separate server (not shown) for managing satellite image data, and in this case, the empty house utilization evaluation server 300 may receive satellite image data from the separate server (not shown).

The empty house utilization evaluation server 300 may receive satellite image data transmitted from the ground station 250, may evaluate utilization of the empty house 100 to be evaluated based on the received satellite image data, and may suggest a use of the empty house 100 to be evaluated.

According to an embodiment, the empty house utilization evaluation server 300 may collect legal information and asset information about the empty house 100 to be evaluated online and may reflect the collected information in the utilization evaluation and the use suggestion for the empty house 100 to be evaluated.

Detailed structure and operation of the empty house utilization evaluation server 300 will be described later with reference to FIG. 2.

A first user who wants to upload information about an empty house may transmit the information about the empty house to the empty house utilization evaluation server 300 through the first user terminal 400. The empty house utilization evaluation server 300 may receive the information about the empty house and store the received information about the empty house.

A second user who wants to request a utilization evaluation for a specific empty house may transmit an empty house utilization evaluation request to the empty house utilization evaluation server 300 through the second user terminal 500. The empty house utilization evaluation server 300 may search information about the empty house 100 to be evaluated corresponding to the received empty house utilization evaluation request. The empty house utilization evaluation server 300 may request satellite image data about the found empty house 100 to be evaluated to the ground station 250 or a separate server (not shown) that manages satellite image data, and may receive the requested satellite image data from the ground station 250 or the separate server (not shown) that manages satellite image data.

According to an embodiment, each of the first user terminal 400 and the second user terminal 500 may be implemented as a mobile communication terminal.

Figure 2:
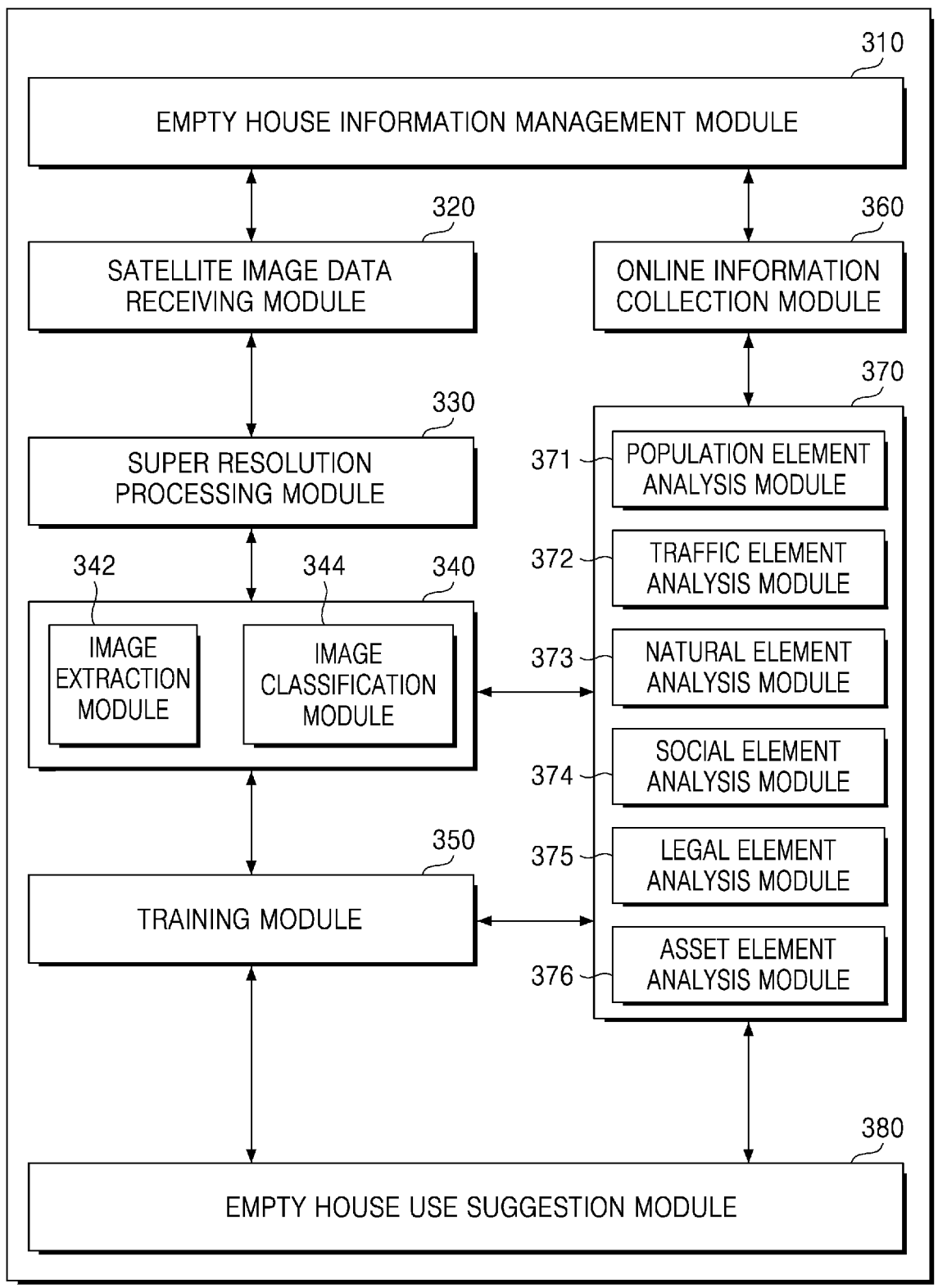
FIG. 2 is a block diagram according to an embodiment of an empty house utilization evaluation server shown in FIG. 1.
Figure 3:
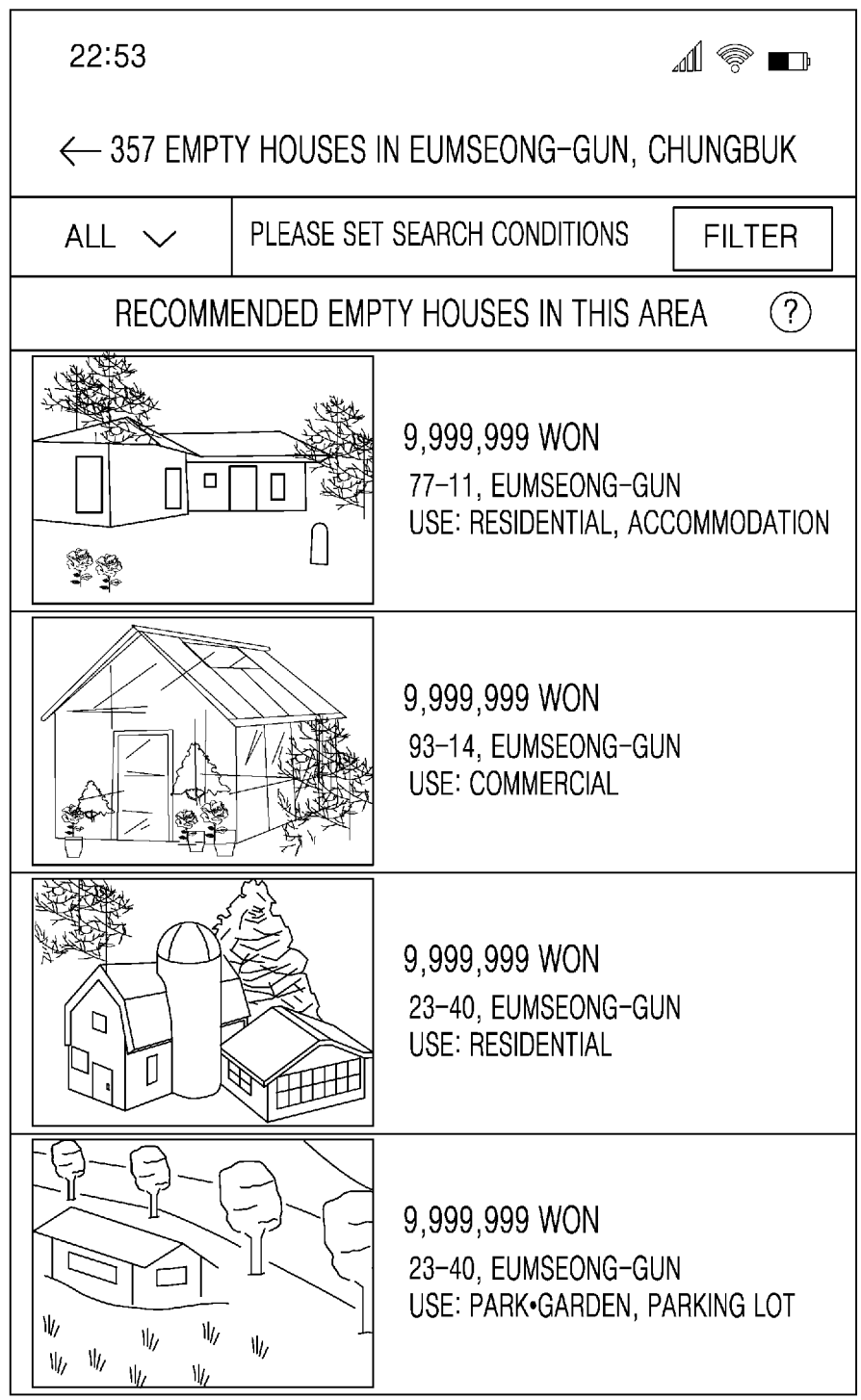
FIG. 3 is a view of an embodiment of an empty house search environment provided through a user terminal in the empty house utilization evaluation system shown in FIG. 1.
Figure 4:
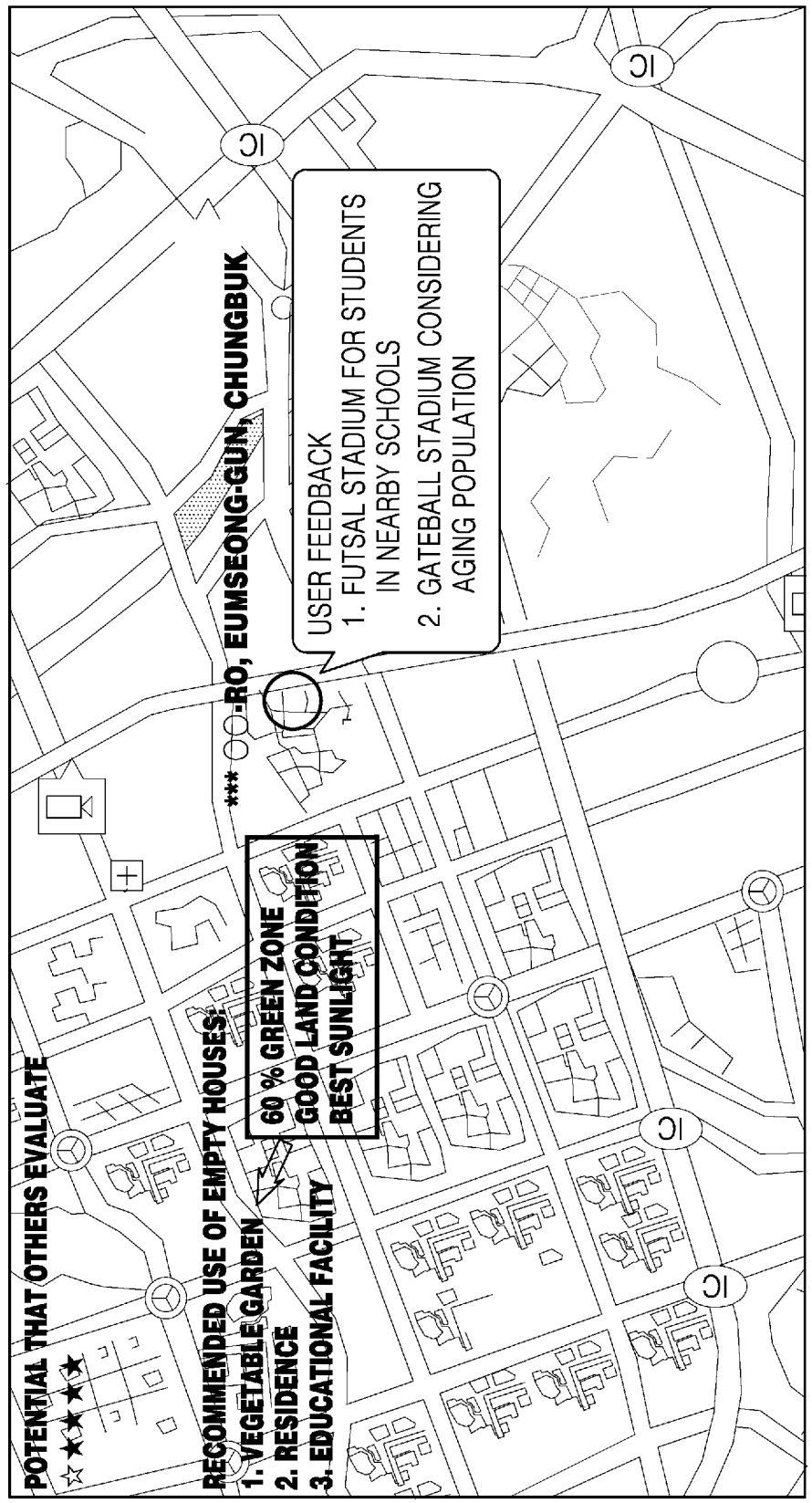
FIG. 4 is a view of an embodiment of an evaluation result and a use suggestion provided through a user terminal in the empty house utilization evaluation system shown in FIG. 1.

FIG. 2 is a block diagram according to an embodiment of the empty house utilization evaluation server 300 shown in FIG. 1. FIG. 3 is a view of an embodiment of an empty house search environment provided through a user terminal in the empty house utilization evaluation system 300 shown in FIG. 1. FIG. 4 is a view of an embodiment of an evaluation result and a use suggestion provided through a user terminal in the empty house utilization evaluation system 300 shown in FIG. 1.

Referring to FIGS. 1 and 2, the empty house utilization evaluation server 300 may include an empty house information management module 310, a satellite image data receiving module 320, a super resolution processing module 330, an image processing module 340, a training module 350, an online information collection module 360, a data analysis module 370, and an empty house use suggestion module 380.

The empty house information management module 310 may store the empty house information transmitted by the first user terminal 400 and manage the stored empty house information.

The empty house information management module 310 may transmit information about the empty house 100 to be evaluated among the stored empty house information, the empty house 100 requested to be found and evaluated by the second user terminal 500, to the satellite image data receiving module 320.

Referring to FIG. 3, the second user may search an empty house through a UI/UX of the second user terminal 500 in an exemplary form shown in FIG. 3, and may request a utilization evaluation of the found empty house 100 to be evaluated.

Referring again to FIG. 2, the satellite image data receiving module 320 may receive the information about the empty house 100 to be evaluated transmitted by the empty house information management module 310, may request satellite image data of the empty house 100 to be evaluated to the ground station 250 or a separate server (not shown) that manages satellite image data, and may receive the requested satellite image data from the ground station 250 or the separate server that manages satellite image data.

According to an embodiment, the satellite image data receiving module 320 may process (e.g., resizing data, changing format) the received satellite image data into a form suitable for use in the empty house utilization evaluation server 300.

The super resolution processing module 330 may perform super resolution processing of the satellite image data received from the satellite image data receiving module 320 and generate super resolution processed satellite image data.

According to an embodiment, the super resolution processing module 330 may improve a resolution of the satellite image data by using various processing techniques (e.g., high frequency component reconstruction, pre-processing filtering, super-resolution filtering, post-processing filtering, etc.).

The image processing module 340 may extract and classify desired images from the satellite image data processed by the super resolution processing module 330.

The image processing module 340 may include an image extraction module 342 and an image classification module 344.

The image extraction module 342 may extract a partial image to be used for evaluating empty house utilization from the satellite image data.

According to an embodiment, the image extraction module 342 may extract at least one of an image of a population element, an image of a traffic element, an image of a natural element, and an image of a social element of the empty house 100 to be evaluated from the satellite image data.

The population element, the traffic element, the natural element, and the social element may mean a population element, a traffic element, a natural element, and a social element that affect a utilization evaluation of the empty house 100 to be evaluated, respectively.

According to an embodiment, when the image extraction module 342 extracts the image of the population element of the empty house 100 to be evaluated from the satellite image data, the image extraction module 342 may extract images of all pedestrians included in the satellite image data by using histogram of oriented gradient (HOG) of the satellite image data. The image extraction module 342 may extract the pedestrians 110, among all the extracted pedestrians, located within a reference radius R from the empty house 100 to be evaluated as the image of the population element of the empty house 100 to be evaluated.

According to an embodiment, the reference radius R may be set through the second user terminal 500.

According to another embodiment, the reference radius R may be trained by the training module 350 based on movement patterns of all pedestrians extracted by the image extraction module 342.

According to an embodiment, when the image extraction module 342 extracts the image of the population element of the empty house 100 to be evaluated from the satellite image data, the image extraction module 342 may extract the image of the population element of the empty house 100 to be evaluated using only satellite image data collected during a reference time among pieces of satellite image data. In this case, the image extraction module 342 may extract the image of the population element of the empty house 100 to be evaluated for each time zone.

According to an embodiment, when the image extraction module 342 extracts the image of the traffic element of the empty house 100 to be evaluated from the satellite image data, the image extraction module 342 may extract an image regarding at least one of the vehicles 120, the public transportation 122, and the boarding place 124 of the public transportation included in the satellite image data. In this case, the image extraction module 342 may use various reference patterns for identifying the vehicle, the public transportation, and the boarding place of the public transportation. The image extraction module 342 may extract a portion of the satellite image data having high similarity with the various reference patterns as the image regarding at least one of the vehicles 120, the public transportation 122, and the boarding place 124 of the public transportation.

According to an embodiment, the image extraction module 342 may extract the vehicles 120, the public transportation 122, and the boarding place 124 of the public transportation within a reference radius from the empty house 100 to be evaluated, among extracted vehicles, public transportation, and boarding places of the public transportation, as the image of the traffic element of the empty house 100 to be evaluated.

According to an embodiment, when the image extraction module 342 extracts the image of the natural element of the empty house 100 to be evaluated from the satellite image data, the image extraction module 342 may extract an image of the green zone 130 included in the satellite image data. In this case, the image extraction module 342 may use various reference patterns (e.g., reference image patterns for trees, forests, rice fields, fields, etc.) for identifying a green zone. The image extraction module 342 may extract a portion of the satellite image data having high similarity with the various reference patterns as the image of the natural element of the empty house 100 to be evaluated.

According to an embodiment, when the image extraction module 342 extracts the image of the social element of the empty house 100 to be evaluated from the satellite image data, the image extraction module 342 may extract images of the neighborhood living facility 140, a tourist destination (not shown), etc. included in the satellite image data. In this case, the image extraction module 342 may use various reference patterns for identifying neighboring living facilities and a reference pattern regarding a feature element in a tourist destination for identifying the tourist destination (e.g., in the case of Gyeongbokgung, reference image patterns related to Gwanghwamun, Geunjeongjeon, etc.). The image extraction module 342 may extract a portion of the satellite image data having high similarity with the various reference patterns as the image of the social element of the empty house 100 to be evaluated.

The image classification module 344 may classify an image extracted by the image extraction module 342 by type (e.g., the image of the population element of the empty house 100 to be evaluated, the image of the traffic element of the empty house 100 to be evaluated, the image of the natural element of the empty house 100 to be evaluated, and the image of the society element of the empty house 100 to be evaluated).

According to an embodiment, an image classification reference of the image classification module 344 may be trained by the training module 350. In this case, the training module 350 may train the image classification reference by using a convolutional neural network (CNN) algorithm.

According to an embodiment, when an image is extracted and classified by the image extraction module 342 at the same time, the image classification module 344 may be omitted.

The training module 350 may train a reference pattern and an image extraction reference for image extraction of the image extraction module 342.

The training module 350 may train the image classification reference of the image classification module 344.

The online information collection module 360 may receive information about the empty house 100 to be evaluated from the empty house information management module 310 and collect legal information and asset information about the empty house 100 to be evaluated online.

According to the embodiment, the legal information may include information about a form (e.g. 1/2/3 class residential areas, quasi-residential area, etc.) of the empty house 100 to be evaluated, the form that may be changed from the existing use of the empty house 100 to be evaluated.

According to an embodiment, the asset information may include information about an official land price, a market price, a deterioration degree (the year of completion), and an area of the empty house 100 to be evaluated.

According to an embodiment, the online information collection module 360 may collect information about a crime rate of the area to which the empty house 100 to be evaluated belongs.

The data analysis module 370 may analyze image data (partial image data) extracted, classified, and transmitted by the image processing module 340 and the information collected by the online information collection module 360 and may transmit a result of the analyzing to the empty house suggestion module 380.

The data analysis module 370 may include a population element analysis module 371, a traffic element analysis module 372, a natural element analysis module 373, a social element analysis module 374, a legal element analysis module 375, and an asset element analysis module 376.

The population element analysis module 371 may receive the image of the population element of the empty house 100 to be evaluated extracted/classified by the image processing module 340 and analyze a grade and a change of the population element of the empty house 100 to be evaluated.

According to an embodiment, the population element analysis module 371 may analyze a walking amount (movement amount) and an activity time (stay time) of the pedestrians 110 around the empty house 100 to be evaluated.

According to an embodiment, the population element analysis module 371 may classify the grade of the population element according to a result of the analyzing.

The traffic element analysis module 372 may receive the image of the traffic element of the empty house 100 to be evaluated extracted/classified by the image processing module 340 and analyze a grade and a change of the traffic element of the empty house 100 to be evaluated.

According to an embodiment, the traffic element analysis module 372 may analyzes the traffic volume of vehicles (e.g., 120) around the empty house 100 to be evaluated, public transportation access around the empty house 100 to be evaluated (e.g., a distance to a moving path of the public transportation 122, a distance to the boarding place 124 of public transportation), and the number of illegal parking vehicles around the empty house 100 to be evaluated (e.g., the number of vehicles parked/stopped on a road where parking/stopping is not possible or parked/stopped off the road in the image of the extracted vehicles 120).

According to an embodiment, the traffic element analysis module 372 may classify the grade of the traffic element according to a result of the analyzing.

The natural element analysis module 373 may receive the image of the natural element of the empty house 100 to be evaluated extracted/classified by the image processing module 340 and analyze a grade and a change of the natural element of the empty house 100 to be evaluated.

According to an embodiment, the natural element analysis module 373 may analyze a ratio, the degree of air pollution, and illumination of the green zone 130 around the empty house 100 to be evaluated. For example, the natural element analysis module 373 may analyze air pollution information according to the degree of dust, fine dust, and ultrafine dust shown in the image of the natural element, and may analyze the illumination based on brightness (the degree of sunlight) displayed in the image of the natural element.

According to an embodiment, the natural element analysis module 373 may classify the grade of the traffic element according to a result of the analyzing.

The social element analysis module 374 may receive the image of the social element of the empty house 100 to be evaluated extracted/classified by the image processing module 340 and analyze a grade and a change of the social element of the empty house 100 to be evaluated.

According to an embodiment, the social element analysis module 374 may analyze a distance between the empty house 100 to be evaluated and the peripheral neighborhood living facility 140 and a distance between the empty house 100 to be evaluated and a peripheral tourist destination.

According to an embodiment, the social element analysis module 374 may classify the grade of the social element according to a result of the analyzing.

The legal element analysis module 375 may receive legal information obtained by the online information collection module 360, and may analyze a grade and a change of the legal element of the empty house 100 to be evaluated.

According to an embodiment, the legal element analysis module 375 may analyze the grade and the change of the legal element according to whether the use of the empty house 100 to be evaluated is changeable and the form (e.g. 1/2/3 class residential areas, quasi-residential area, etc.) of the empty house 100 to be evaluated, the form that may be changed from the existing use of the empty house 100 to be evaluated.

The asset element analysis module 376 may receive legal information obtained by the online information collection module 360 and may analyze a grade and a change of the asset element of the empty house 100 to be evaluated.

According to an embodiment, the asset element analysis module 376 may analyze the grade and the change of the asset element of the empty house 100 to be evaluated according to the official land price, the market price, the deterioration degree (the year of completion), and the area of the empty house 100 to be evaluated.

According to an embodiment, the asset element analysis module 376 may reflect numerical values of the land price, the market price, and the area in the analysis without classifying the land price, the market price, and the area.

Results analyzed by each of the analysis modules 371 to 376 of the data analysis module 370 may be transferred to the empty house use suggestion module 380.

The empty house use suggestion module 380 may suggest the most suitable use for the empty house 100 to be evaluated, according to the analysis results of the population element, the traffic element, the natural element, the social element, the legal element, and the asset element of the empty house 100 to be evaluated received from the data analysis module 360.

According to an embodiment, the empty house use suggestion module 380 may suggest the use of the empty house 100 to be evaluated for various uses such as a residence, a lodging facility, a park/garden, a parking lot, a vegetable garden, an experience complex/camping site, and the like according to the analysis results of the population element, the traffic element, the natural element, the social element, the legal element, and the asset element.

For example, the empty house use suggestion module 380 may suggest the use of the empty house to be evaluated 100 as a residence when the empty house 100 to be evaluated is rated high in the population element, the traffic element, the social element, and the asset element.

For example, the empty house use suggestion module 380 may suggest the use of the empty house 100 to be evaluated as a vegetable garden when the empty house to be evaluated 100 is rated high in the natural element and low in the asset element.

According to an embodiment, the empty house use suggestion module 380 may include a mapping table in which corresponding uses are mapped according to the overall grade of the population element, the traffic element, the natural element, the social element, the legal element, and the asset element.

According to an embodiment, the mapping table included in the empty house use suggestion module 380 may be updated by a training process of the training module 350.

Referring to FIG. 4 together, a use suggested by the empty house use suggestion module 380 and a description of the suggested use is transmitted from the empty house utilization evaluation server 300 to the second user terminal 500 and may be displayed on a display of the second user terminal 500 in an exemplary form as shown in FIG. 4.

FIG. 5 is a flowchart of an empty house utilization evaluation method according to an embodiment.

Referring to FIGS. 1 to 5, in operation S501, the empty house utilization evaluation server 300 may receive satellite image data for the empty house 100 to be evaluated.

According to an embodiment, the empty house utilization evaluation server 300 may receive the satellite image data directly from the satellite 200, through the ground station 250, or from a separate server (not shown) for managing the satellite image data.

In operation S502, the empty house utilization evaluation server 300 may collect online information about the law and asset related to the empty house 100 to be evaluated.

According to an embodiment, the online information about the law may include information about a form (e.g. 1/2/3 class residential areas, quasi-residential area, etc.) of the empty house 100 to be evaluated, the form that may be changed from the existing use of the empty house 100 to be evaluated.

According to an embodiment, the online information about the asset may include information about the official land price, the market price, the deterioration degree (the year of completion), and the area of the empty house 100 to be evaluated.

In operation S503, the empty house utilization evaluation server 300 may perform super resolution processing of the satellite image data received in operation S501.

In operation S504, the empty house utilization evaluation server 300 may extract an image of at least one of the population element, the traffic element, the natural element, and the social element of the empty house 100 to be evaluated from the satellite image data processed in operation S503.

In operation S505, the empty house utilization evaluation server 300 may analyze the utilization of the empty house 100 to be evaluated based on the image extracted in operation S504 and the online information collected in operation S502.

According to an embodiment, the empty house utilization evaluation server 300 may analyze the utilization of the empty house 100 to be evaluated using only the image extracted in operation S504.

In operation S506, the empty house utilization evaluation server 300 may suggest the use of the empty house 100 to be evaluated according to a result of the analyzing at operation S505.

According to an embodiment, the empty house utilization evaluation server 300 may be implemented to include a memory or a database for storing collected data and a processor for processing the collected data. In this case, each of the components 310 to 380 of the empty house utilization evaluation server 300 may be implemented to include a combination of the memory or the database and the processor.

According to an embodiment of the disclosure, an empty house utilization evaluation method according to an embodiment may be implemented in program code and stored in a medium, and the medium may be combined with a processor to perform the empty house utilization evaluation method.

While the disclosure has been particularly shown and described with reference to embodiments thereof, it will be understood that various changes in form and details may be made therein without departing from the spirit and scope of the following claims.

Method and apparatus according to an embodiment of the disclosure may suggest an optimized use of an empty house to be evaluated by evaluating the utilization of the empty house to be evaluated based on satellite image data of the empty house to be evaluated and suggesting the use based on a result of the evaluating.

In addition, according to the method and apparatus according to the embodiment of the disclosure, a user may directly upload information about an empty house, and may be suggested for a use of the empty house directly in response to a request for evaluation.

What is claimed is:

1. An empty house utilization evaluation method comprising:
   receiving, by an empty house utilization evaluation server, satellite image data for an empty house to be evaluated;
   extracting, by the empty house utilization evaluation server, images of a population element, a traffic element, a natural element, and a social element of the empty house to be evaluated from the received satellite image data;
   analyzing, by the empty house utilization evaluation server, utilization of the empty house to be evaluated based on the extracted images of the population element, the traffic element, a natural element, and the social element of the empty house to be evaluated; and
   suggesting, by the empty house utilization evaluation server, a use of the empty house to be evaluated according to a result of the analyzing utilization of the empty house to be evaluated,
   wherein the analyzing of the utilization of the empty house to be evaluated comprises:

analyzing, by the empty house utilization evaluation server, a walking amount of pedestrians around the empty house to be evaluated and a stay time of the pedestrians using the extracted image of the population element of the empty house to be evaluated; and analyzing, by the empty house utilization evaluation server, a green zone ratio, air pollution information, and illumination around the empty house to be evaluated using the extracted image of the natural element of the empty house to be evaluated, wherein the empty house utilization evaluation server analyzes air pollution information according to the degree of dust, fine dust, and ultrafine dust shown in the image of the natural element of the empty house to be evaluated, and the suggesting of the use of the empty house to be evaluated comprises:

suggesting the use of the empty house to be evaluated using a mapping table in which corresponding uses are mapped according to grades of the population element, the traffic element, the natural element, and the social element.

2. The empty house utilization evaluation method of claim 1, further comprising:

prior to receiving the satellite image data, receiving, by the empty house utilization evaluation server, empty house information transmitted from the first user and storing the received empty house information.

3. The empty house utilization evaluation method of claim 2, further comprising:

after storing the received empty house information, searching, by the empty house utilization evaluation server in response to an empty house utilization evaluation request by a second user, information about the empty house to be evaluated corresponding to the empty house utilization evaluation request among stored empty house information.

4. The empty house utilization evaluation method of claim 3, further comprising:

after searching the information about the empty house to be evaluated, requesting, by the empty house utilization evaluation server, satellite image data of the found empty house to be evaluated.

5. The empty house utilization evaluation method of claim 1, further comprising:

generating, by the empty house utilization evaluation server, satellite image data subjected to super resolution by super resolution processing the received satellite image data.

6. The empty house utilization evaluation method of claim 1, further comprising:

extracting pedestrians within a reference radius from the empty house to be evaluated among extracted pedestrians in the satellite image data as the image of the population element of the empty house to be evaluated using histogram of oriented gradient (HOG).

7. The empty house utilization evaluation method of claim 1, wherein the analyzing of the utilization of the empty house to be evaluated comprises:

analyzing, by the empty house utilization evaluation server, traffic volume around the empty house to be evaluated, public transportation access around the empty house to be evaluated, and the number of illegal parking vehicles around the empty house to be evaluated using the extracted image of the traffic element of the empty house to be evaluated.

8. The empty house utilization evaluation method of claim 1, wherein the analyzing of the utilization of the empty house to be evaluated comprises:

analyzing, by the empty house utilization evaluation server, a distance between the empty house to be evaluated and a peripheral neighborhood living facility and a distance between the empty house to be evaluated and a peripheral tourist destination using the extracted image of the social element of the empty house to be evaluated.

9. The empty house utilization evaluation method of claim 1, further comprising:

collecting, by the empty house utilization evaluation server, legal information and asset information about the empty house to be evaluated online.

10. The empty house utilization evaluation method of claim 9, wherein the suggesting of the use of the empty house to be evaluated comprises:

suggesting the use of the empty house to be evaluated according to a result of the analyzing of the utilization of the empty house to be evaluated, and the collected legal information and asset information about the empty house to be evaluated.

11. The empty house utilization evaluation method of claim 10, wherein the legal information about the empty house to be evaluated comprises:

information about a form of the empty house to be evaluated, the form that may be changed from the existing use of the empty house to be evaluated, and the asset information about the empty house to be evaluated comprises:

information about an official land price, a market price, a deterioration degree, and an area of the empty house to be evaluated.

12. An empty house utilization evaluation server, the empty house utilization evaluation server comprising at least one processor and a memory under control of the processor and the memory includes a computer program enabling the empty house utilization evaluation server to perform operations comprising:

receiving satellite image data for an empty house to be evaluated;

extracting images of a population element, a traffic element, a natural element, and a social element of the empty house to be evaluated from the received satellite image data;

analyzing utilization of the empty house to be evaluated based on the extracted images of the population element, the traffic element, the natural element, and the social element of the empty house to be evaluated; and suggesting a use of the empty house to be evaluated according to a result of the analyzing of the utilization of the empty house to be evaluated, wherein the empty house utilization evaluation server analyzes a walking amount of pedestrians around the empty house to be evaluated and a stay time of the pedestrians using the extracted image of the population element of the empty house to be evaluated, and analyzes a green zone ratio, air pollution information, and illumination around the empty house to be evaluated using the extracted image of the natural element of the empty house to be evaluated, wherein the air pollution information is analyzed according to the degree of dust, fine dust, or ultrafine dust shown in the image of the natural element of the empty house to be evaluated, and the empty house utilization evaluation server suggests the use of the empty house to be evaluated using a mapping table in which corresponding uses are mapped according to grades of the population element, the traffic element, the natural element, and the social element.

13. An empty house utilization evaluation system comprising:

a user terminal; and an empty house utilization evaluation server configured to perform a utilization evaluation of an empty house to be evaluated requested by the user terminal, and to provide the user terminal with a use of the empty house to be evaluated suggested according to a result of the utilization evaluation, wherein the empty house utilization evaluation server comprises at least one processor and a memory under control of the processor and the memory includes a computer program enabling the empty house utilization evaluation server to perform operations comprising:

receiving satellite image data for an empty house to be evaluated;

extracting images of a population element, a traffic element, a natural element, and a social element of the empty house to be evaluated from the received satellite image data;

analyzing utilization of the empty house to be evaluated based on the extracted images of the population element, the traffic element, the natural element, and the social element of the empty house to be evaluated; and suggesting the use of the empty house to be evaluated according to a result of the analyzing of the utilization of the empty house to be evaluated, wherein the empty house utilization evaluation server analyzes a walking amount of pedestrians around the empty house to be evaluated and a stay time of the pedestrians using the extracted image of the population element of the empty house to be evaluated, and analyzes a green zone ratio, air pollution information, and illumination around the empty house to be evaluated using the extracted image of the natural element of the empty house to be evaluated, wherein the air pollution information is analyzed according to the degree of dust, fine dust, or ultrafine dust shown in the image of the natural element of the empty house to be evaluated, and the empty house utilization evaluation server suggests the use of the empty house to be evaluated using a mapping table in which corresponding uses are mapped according to grades of the population element, the traffic element, the natural element, and the social element.

* * * * *